(12) United States Patent
Yasrebi et al.

(10) Patent No.: US 10,264,134 B2
(45) Date of Patent: Apr. 16, 2019

(54) METHODS AND APPARATUS TO DYNAMICALLY SELECT A PEERED VOICE OVER INTERNET PROTOCOL (VOIP) BORDER ELEMENT

(71) Applicant: AT&T Intellectual Property I, L.P., Atlanta, GA (US)

(72) Inventors: Mehrad Yasrebi, Austin, TX (US); James Jackson, Austin, TX (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 9 days.

(21) Appl. No.: 15/489,833

(22) Filed: Apr. 18, 2017

(65) Prior Publication Data

US 2017/0223192 A1    Aug. 3, 2017

Related U.S. Application Data

(63) Continuation of application No. 14/952,503, filed on Nov. 25, 2015, now Pat. No. 9,661,148, which is a continuation of application No. 11/845,519, filed on Aug. 27, 2007, now Pat. No. 9,258,268.

(51) Int. Cl.
| | |
|---|---|
| *H04M 3/22* | (2006.01) |
| *H04M 7/12* | (2006.01) |
| *H04L 12/54* | (2013.01) |
| *H04L 29/06* | (2006.01) |
| *H04L 29/12* | (2006.01) |
| *H04L 12/803* | (2013.01) |

(52) U.S. Cl.
CPC ........ *H04M 7/128* (2013.01); *H04L 12/5691* (2013.01); *H04L 29/12896* (2013.01); *H04L 47/125* (2013.01); *H04L 61/106* (2013.01); *H04L 61/605* (2013.01); *H04L 65/1016* (2013.01); *H04L 65/1069* (2013.01); *H04M 3/2263* (2013.01); *H04M 7/1275* (2013.01); *H04L 29/12066* (2013.01); *H04L 61/1511* (2013.01)

(58) Field of Classification Search
CPC ............. H04M 1/2535; H04M 7/0069; H04M 7/0057; H04M 7/005
See application file for complete search history.

(56) References Cited

U.S. PATENT DOCUMENTS

| | | |
|---|---|---|
| 6,856,991 B1 | 2/2005 | Srivastava |
| 6,914,886 B2 | 7/2005 | Peles et al. |
| 7,047,315 B1 | 5/2006 | Srivastava |
| | (Continued) | |

OTHER PUBLICATIONS

United States Patent and Trademark Office, "Non-Final Office Action," issued in connection with U.S. Appl. No. 11/845,519, dated Jul. 19, 2011, 19 pages.

(Continued)

*Primary Examiner* — Melanie Jagannathan
(74) *Attorney, Agent, or Firm* — Hanley, Flight & Zimmerman, LLC

(57) ABSTRACT

Methods and apparatus to select a dynamically peered voice over Internet protocol (VoIP) border element are disclosed. An example method comprises collecting data representative of a dynamic performance of a voice over Internet protocol network, prioritizing a selection of a peered border element based on the collected data, and modifying a telephone number mapping (ENUM) database based on the prioritized selection.

19 Claims, 4 Drawing Sheets

(56) References Cited

U.S. PATENT DOCUMENTS

| | | |
|---|---|---|
| 7,088,718 B1 | 8/2006 | Srivastava |
| 7,145,898 B1 | 12/2006 | Elliott |
| 7,180,864 B2 | 2/2007 | Basu et al. |
| 7,180,912 B1 | 2/2007 | Samarasinghe |
| 7,197,040 B2 | 3/2007 | Bressoud et al. |
| 7,995,739 B1 | 8/2011 | Croak et al. |
| 9,258,268 B2 | 2/2016 | Yasrebi et al. |
| 2003/0079027 A1 | 4/2003 | Slocombe et al. |
| 2003/0117954 A1 | 6/2003 | De Neve et al. |
| 2003/0182410 A1 | 9/2003 | Balan et al. |
| 2003/0200307 A1 | 10/2003 | Raju et al. |
| 2004/0146045 A1 | 7/2004 | Jimmei et al. |
| 2004/0210670 A1 | 10/2004 | Anerousis et al. |
| 2005/0010653 A1 | 1/2005 | McCanne |
| 2005/0044141 A1 | 2/2005 | Hameleers et al. |
| 2005/0058125 A1 | 3/2005 | Mutikainen et al. |
| 2005/0083912 A1 | 4/2005 | Afshar et al. |
| 2005/0149531 A1 | 7/2005 | Srivastava |
| 2005/0182781 A1 | 8/2005 | Bouvet |
| 2005/0226223 A1 | 10/2005 | Kaizawa et al. |
| 2006/0013147 A1 | 1/2006 | Terpstra et al. |
| 2006/0064478 A1 | 3/2006 | Sirkin |
| 2006/0112170 A1 | 5/2006 | Sirkin |
| 2006/0130064 A1 | 6/2006 | Srivastava |
| 2006/0146792 A1 | 7/2006 | Ramachandran et al. |
| 2006/0159100 A1 | 7/2006 | Droms et al. |
| 2006/0165064 A1 | 7/2006 | Brown et al. |
| 2006/0209851 A1 | 9/2006 | Scudder et al. |
| 2006/0233155 A1 | 10/2006 | Srivastava |
| 2006/0233158 A1 | 10/2006 | Croak et al. |
| 2006/0233159 A1 | 10/2006 | Croak et al. |
| 2006/0291450 A1 | 12/2006 | Ramachandran et al. |
| 2007/0019619 A1 | 1/2007 | Foster et al. |
| 2007/0019623 A1 | 1/2007 | Alt et al. |
| 2007/0036143 A1 | 2/2007 | Alt et al. |
| 2007/0036151 A1 | 2/2007 | Baeder |
| 2007/0047446 A1 | 3/2007 | Dalal et al. |
| 2007/0058629 A1 | 3/2007 | Luft |
| 2007/0061397 A1 | 3/2007 | Gregorat et al. |
| 2007/0071221 A1 | 3/2007 | Allen et al. |
| 2007/0073898 A1 | 3/2007 | Shen |
| 2007/0086432 A1 | 4/2007 | Schneider et al. |
| 2007/0086582 A1 | 4/2007 | Tai et al. |
| 2007/0091878 A1 | 4/2007 | Croak et al. |
| 2016/0080576 A1 | 3/2016 | Yasrebi et al. |

OTHER PUBLICATIONS

United States Patent and Trademark Office, "Final Office Action," issued in connection with U.S. Appl. No. 11/845,519, dated Mar. 13, 2012, 16 pages.

United States Patent and Trademark Office, "Examiner's Answer," issued in connection with U.S. Appl. No. 11/845,519, dated Nov. 21, 2012, 6 pages.

United States Patent and Trademark Office, "Decision on Appeal," issued in connection with U.S. Appl. No. 11/845,519, dated Jun. 24, 2015, 6 pages.

United States Patent and Trademark Office, "Notice of Allowance," issued in connection with U.S. Appl. No. 11/845,519, dated Sep. 22, 2015, 13 pages.

United States Patent and Trademark Office, "Corrected Notice of Allowability," issued in connection with U.S. Appl. No. 11/845,519, dated Jan. 8, 2016, 5 pages.

Rosenberg, "Requirements for Management of Overload in the Session Initiation Protocol draft-ietf-sipping-overload-reqs-02," IETF draft recommendation, Oct. 22, 2006, retrieved from <http:;//www.tools.ieff.org/html/draft-rosenberg-sipping-overload-reqs-02>, retrieved on Aug. 11, 2008, 21 pages.

United States Patent and Trademark Office, "Non-Final Office Action," issued in connection with U.S. Appl. No. 14/952,503, dated Jul. 26, 2016, 7 pages.

United States Patent and Trademark Office, "Notice of Allowance," issued in connection with U.S. Appl. No. 14/952,503, dated Jan. 19, 2017, 8 pages.

METHODS AND APPARATUS TO DYNAMICALLY SELECT A PEERED VOICE OVER INTERNET PROTOCOL (VOIP) BORDER ELEMENT

RELATED APPLICATIONS

This patent arises from a continuation of U.S. application Ser. No. 14/952,503 (now U.S. Pat. No. 9,661,148), filed on Nov. 25, 2015, which is a continuation of U.S. application Ser. No. 11/845,519 (now U.S. Pat. No. 9,258,268), filed on Aug. 27, 2007, both of which are hereby incorporated herein by reference in their entireties.

FIELD OF THE DISCLOSURE

This disclosure relates generally to voice over Internet protocol (VoIP) networks and, more particularly, to methods and apparatus to dynamically select a peered VoIP border element.

BACKGROUND

Many voice over Internet Protocol (VoIP) service providers use peered border elements to allow a subscriber of a first VoIP service provider to initiate and/or establish a VoIP and/or Internet protocol (IP) Multimedia Subsystem (IMS) communication session with a subscriber of a second VoIP service provider. In general, peered border elements are responsible for processing, handling and/or routing signaling and/or media between two VoIP service provider networks. In many instances, two VoIP service providers will be peered via two or more pairs of border elements located at different geographic locations.

DETAILED DESCRIPTION

Methods and apparatus to dynamically select a peered voice over Internet protocol (VoIP) border element are disclosed. A disclosed example method includes collecting data representative of a dynamic performance of a voice over Internet protocol network, prioritizing a selection of a peered border element based on the collected data, and modifying a telephone number mapping (ENUM) database based on the prioritized selection.

Another disclosed example method includes receiving a session initiation protocol (SIP) message that includes a called party identifier, querying a telephone number mapping database based on the called party identifier to obtain two or more peered voice over Internet protocol (VoIP) border element identifiers and two or more priorities for respective ones of the two or more peered VoIP border element identifiers, and selecting a one of the two or more peered VoIP border element identifiers based on the two or more priorities.

A disclosed example apparatus includes a data collector to collect data representative of a dynamic performance of a voice over Internet protocol network, a peer prioritizer to prioritize a selection of a peered border element based on the collected data, and a telephone number mapping (ENUM) database interface to modify an ENUM database based on the prioritized selection.

In the interest of brevity and clarity, throughout the following disclosure references will be made to the example Internet protocol (IP) Multimedia subsystem (IMS) based voice over IP (VoIP) network 110 of FIG. 1. Moreover, the following disclosure will be made using session initiation protocol (SIP) messages and/or SIP-based message exchanges. However, it should be understood that the methods and apparatus described herein to select a peered border element are applicable to other IMS and/or VoIP communication systems and/or networks (e.g., networks based on soft switches), VoIP devices, IMS devices, feature servers, tElephone NUMber mapping (ENUM) servers, border elements, access networks, IP networks, IMS networks and/or IMS communication systems, and/or other types of protocols, messages, and/or message exchanges.

Figure 1:
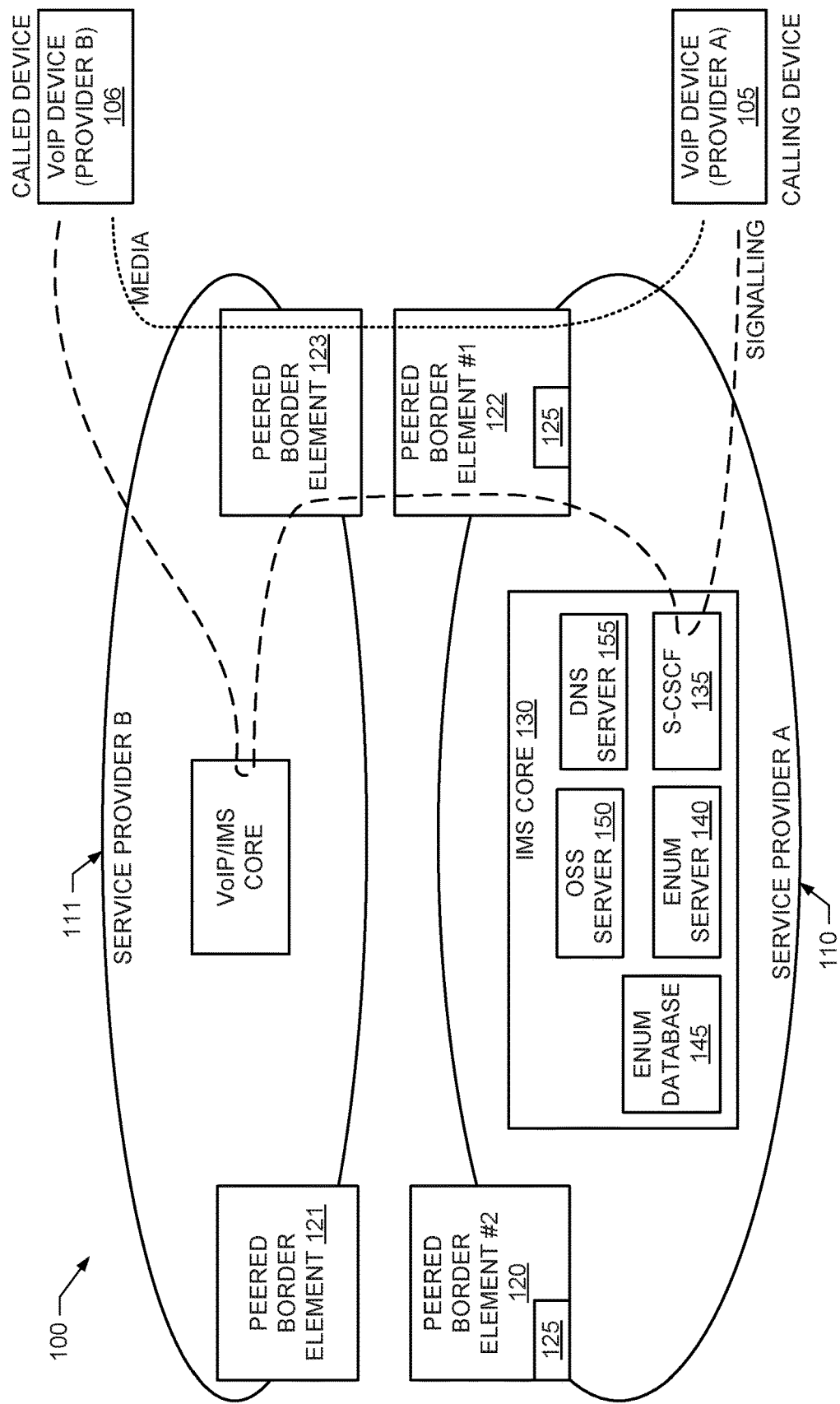
FIG. 1 is a schematic illustration of an example communication systems constructed in accordance with the teachings of the disclosure.

FIG. 1 is a schematic illustration of an example communication system 100 including any number and/or type(s) of VoIP user devices, two of which are designated at reference numerals 105 and 106. Example VoIP user devices 105 and 106 include, but are not limited to, IMS (e.g., VoIP) phones, VoIP residential gateways, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), and/or VoIP kiosks. The example VoIP devices 105 and 106 of FIG. 1 may be implemented and/or be found at any number and/or type(s) of locations. Further, the VoIP devices 105 and 106 may be fixed location devices, substantially fixed location devices and/or mobile devices. Moreover, the VoIP devices 105 and 106 may have equipment communicatively and/or electrically coupled to them. For example, a VoIP ATA may be coupled to a telephone, and/or a VoIP residential gateway may be coupled to a PC and/or set-top box. Further still, the VoIP devices 105 and 106 may be associated with the same and/or different service providers. For example as shown in FIG. 1, the VoIP device 105 is associated with a first service provider 110, and the VoIP device 106 is associated with a second service provider 111.

To provide communication services to a first set of subscribers (e.g., associated with a first service provider), the example communication system 100 of FIG. 1 includes an IMS network 110 made available by the service provider A. Likewise, to provide communication services to a second set of subscribers (e.g., associated with a second service provider), the example communication system 100 of FIG. 1 includes any type of IMS and/or VoIP network 111 made available by the service provider B. In some instances, the example network 111 implements any or all of the example methods and/or apparatus to select a peered border element described below in connection with the IMS network 110. In general, the example IMS network 110 of FIG. 1 provides and/or enables IMS communication services (e.g., telephone services, Internet services, data services, messaging services, instant messaging services, electronic mail (email) services, chat services, video services, audio services, gaming services, voicemail, facsimile services, etc.) to the example VoIP device 105, and/or to VoIP devices of other service providers (e.g., the example VoIP device 106).

The example service provider networks 110 and 111 of FIG. 1 are communicatively coupled via any number of pairs of peered border elements. A first pair of peered border elements is designated in FIG. 1 with reference numerals 120 and 121, and a second pair of peered border elements is designated with reference numerals 122 and 123. Mated pairs of peered border elements 120-123 implement, for example, handshaking, media translation(s) and/or protocol message modification(s) to facilitate communication sessions between subscribers of two service provider networks (e.g., the example networks 110 and 111).

Typically, the pairs of peered border elements 120, 121 and 122, 123 are located so as to provide communicatively coupling between the service provider networks 110 and 111 at geographically separated locations. The locations at which peered border elements 120, 122 are located may differ depending on with which service provider(s) the IMS network 110 has a peering relation. Further, while the service provider 110 of FIG. 1 is illustrated as having a peering relationship with service provider 111, the service provider 110 may have other peering relationships with other service providers. Moreover, the peering locations for those other service providers may be different from the peering locations for service provider 111. In some examples, there may be more than one pair of peered bordered elements 120, 121 and 122, 123 at a given geographic location. In such examples, the additional peered border elements 120, 121 and 122, 123 may be implemented for redundancy purposes and/or to provide additional processing capability(-ies) at that location. In some examples, the peered border elements 120-123 are located at IP peering locations to facilitate deterministic IP quality-of-service. However, not all IP peering locations need support VoIP peering.

To collect real-time and/or dynamic network performance data and/or information, each of the example peered border elements 120 and 122 includes a performance monitor 125. The example performance monitors 125 of FIG. 1 measure, collect and/or aggregate any number and/or type(s) of data and/or information representative of the historical and/or present performance of the IMS network 110. Example network performance data and/or information may include, but is not limited to, jitter, round-trip delay, latency, out of order data, data throughput rate, processing load, memory usage, communication path utilization, border element status (e.g., operational, failing and/or failed), etc. The example performance monitors 125 may be configured to collect data within any layer of a protocol stack implemented by the border elements 120 and/or 121. As described below, the data and/or information measured, collected and/or aggregated by the performance monitors 125 may be used to determine one or more parameters representative of the real-time, dynamic properties of the IMS network 110, such as routing congestions, overloaded border elements, partially and/or fully failed border elements, etc. In some example, performance monitors 125 may be implemented by other devices of the IMS network 110, such as routers, switches, hubs, etc. Devices and/or servers of the service provider 111 may also collect real-time and/or dynamic network performance data and/or information. In such instances, the service providers 110 and 111 may exchange collected network performance data and/or information to enable each service provider 110, 111 to better optimize the performance of their network, but such an exchange is not mandatory for proper implementation of the example methods and apparatus to dynamically select a peered VoIP border element described herein.

To implement the communication services, the example IMS network 110 of FIG. 1 includes an IMS core 130. In the illustrated example IMS network 110 of FIG. 1, each VoIP device (e.g., the example VoIP device 105) that is registered to the example IMS network 110 is associated with and/or assigned to a serving call session control function (S-CSCF) server (one of which is designated in FIG. 1 with reference numeral 135). The example S-CSCF server 135 of FIG. 1 is responsible for handling incoming and/or outgoing IMS (e.g., VoIP) communication sessions (e.g., telephone calls, and/or data and/or video sessions) associated with its registered VoIP devices (e.g., the VoIP device 105). An example operation of the example S-CSCF server 135 of FIG. 1 is described below in connection with FIG. 2.

While one S-CSCF server 135 is illustrated in FIG. 1, the IMS core 130 and/or, more generally, the example IMS network 110 may include any number and/or type(s) of S-CSCF servers, and each such S-CSCF server may support any number and/or type(s) of VoIP devices. The example S-CSCF server 135 of FIG. 1 performs session control, maintains session states and/or enables communications with call feature servers (not shown) for its associated and/or registered VoIP devices. For instance, when the VoIP device 105 initiates, for example, an outgoing telephone call to the example VoIP device 106, a communication session initiation message (e.g., a SIP INVITE message) sent by the VoIP device 105 is routed by the IMS network 110 to the S-CSCF server 135 associated with the VoIP device 105.

To locate and/or identify the VoIP device and/or VoIP endpoint (e.g., the example VoIP device 106) associated with a called party (e.g., a called telephone number), the example IMS core 130 of FIG. 1 includes any number of ENUM servers, one of which is designated in FIG. 1 with reference numeral 140. Based upon an ENUM query request message received from a S-CSCF server (e.g., the example S-CSCF server 135), the example ENUM server 140 of FIG. 1 performs a lookup of an ENUM database 145 that stores associations of called party identifiers (e.g., E.164 telephone numbers) to one or more uniform resource identifiers (URIs) (e.g., a SIP URI, an HTTP URI, etc. corresponding to peered border elements and/or called devices). However, an ENUM database may store any number and/or type(s) of associations between any number and/or type(s) of identifiers. The example ENUM server 140 returns the one or more URIs to the S-CSCF server 135.

As described below in connection with FIG. 4, the example ENUM database 145 may contain more than one database records to associate more than one URI with a particular called party identifier. For example, if a called party (e.g., the VoIP device 106) is associated with another service provider (e.g., the example network 111), the ENUM database 145 may contain database records for each of one or more peered border elements 120, 122 via which the communication session may be established. When two or more database records (e.g., corresponding to two or more peered border elements 120, 122) are listed for a called party identifier, each of the database records may have one or more associated values that represent a relative prioritization of each destination. The priority values (and/or the order in which the database records are listed in the ENUM database 145) are returned by the ENUM server 140 to the S-CSCF server 135 along with the URIs, and allow the S-CSCF server 135 to select a particular destination (e.g., a particular peered border element 120, 122). For example, the S-CSCF server 135 may a) select the peered border element 120, 122 having the highest priority value, b) ignore peered border elements 120, 122 having a priority value less than a threshold, and then pick from the remaining possible peered border elements 120, 122 using a round-robin scheme, or c) pick the peered border element 120, 122 that is first in an order list of peered border elements 120, 122. In the absence of priority values (and/or listing order information), the S-CSCF server 135 may select a particular destination using any applicable method(s), algorithm(s) and/or logic, such as round-robin selection. A returned URI may also be returned with an indication that the URI is inactive and, thus, not available to be selected and/or used by the S-CSCF server 135 for the called party. In some examples, the example ENUM server 140 does not return such inactive URIs to the S-CSCF server 135.

To determine and/or adjust the relative priority of the ENUM database records for called parties, the example IMS core 130 of FIG. 1 includes an operational support system (OSS) server 150. In the illustrated example of FIG. 1, the OSS server 150 represents one or more elements of a network operations center and/or one or more elements of an operational support system. The example OSS server 150 periodically and/or aperiodically collects the network performance data and/or information collected by the example performance monitors 125. Based on the collected network performance data and/or information, the example OSS server 150 periodically and/or aperiodically computes one or more metrics that may be used to prioritize the selection of the peered border elements 120, 122. For example, the OSS can compute the congestion of communication paths associated with the peered border elements 120, 122, the processing load of the peered border elements 120, 122, and/or the state(s) of the peered border elements 120,122 (e.g., operational, partially failed, failing and/or failed). Such metrics may be computed using any past, present and/or future algorithm(s), method(s), apparatus and/or logic, and descriptions of the same are beyond the scope of this disclosure. An example manner of implementing the example OSS server 150 of FIG. 1 is described below in connection with FIG. 3.

Based on the computed metrics, the example OSS server 150 of FIG. 1 prioritizes the order in which the peered border elements 120, 122 are to be selected. For example, lightly loaded peered border elements 120, 122 are preferred over more heavily loaded peered border elements 120, 122, failing and/or failed peered border elements 120, 122 are to be avoided, peered border elements 120, 122 having congested communication paths and/or links are less preferable to ones have less congested communication paths and/or links, etc. After prioritizing the selection of the peered border elements 120, 122, the example OSS server 150 modifies one or more records of the ENUM database 145 to represent the computed relative priorities of the peered border elements 120, 122. ENUM database records may be prioritized by modifying priority values of the ENUM database records and/or by re-ordering the records. Additionally or alternatively, ENUM database records may be added and/or removed for a particular called party. For example, if a particular peered border element 120, 122 has failed and, thus, not available to process a communication session for the called party, its associated ENUM database record may be removed and/or marked as inactive. Likewise, the OSS server 150 may change the status of a particular peered border element 120, 122 from an inactive state to an active state (e.g., available for routing a communication session) by updating its associated ENUM database record. If a route for a called party is unavailable, the ENUM database may be modified to indicate an alternative route (e.g., use peered border elements 120 and 121 rather than peered border elements 122 and 123). The OSS server 150 may modify the ENUM database 145 directly by, for example, locking a database record to be changed, modifying the database record, and then unlocking the database record. Additionally or alternatively, the ENUM database 145 may be modified by accessing an application programming interface (API) implemented by and/or provided by the example ENUM server 140.

The modifications of the ENUM database 145 by the example OSS server 150 of FIG. 1 may be performed without the involvement and/or knowledge of the S-CSCE server 135 and/or the ENUM server 140. In this way, the OSS server 150 can adaptively affect the prioritized selection of the peered border elements 120, 122 without there being a need to modify traditional ENUM functions and/or services typically implemented by the S-CSCF server 135 and/or the ENUM server 140. Moreover, if the method(s) and/or algorithm(s) by which the selection of the peered border elements 120, 122 are changed, the S-CSCF server 135 and/or the ENUM server 140 do not require modification, as the changes may be localized to the OSS server 150. By prioritizing the selection of the peered border elements 120, 122, the OSS server 150 reduces the likelihood of routing errors, reduces communication session setup times, adjusts the IMS network 110 in response to failing/failed devices, etc., as compared to traditional peered border elements selection methods.

To resolve a URI to an IP address, the example IMS core 130 of FIG. 1 includes any type of DNS server 155. For a particular URI (SIP, HTTP and/or otherwise) and using any applicable method(s), logic and/or algorithm(s), the example DNS server 155 performs a DNS lookup to obtain an IP address assigned to and/or associated with the URI.

While an example IMS network 110 has been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example peered border elements 120, 122, the example performance monitors 125, the example IMS core 130, the example S-CSCF server 135, the example ENUM server 140, the example OSS server 150, the example DNS server 155 illustrated in FIG. 1 are logical entities. They may, therefore, be implemented separately and/or in any combination using, for example, machine accessible instructions executed by one or more computing devices and/or computing platforms (e.g., the example processing platform 700 of FIG. 7). Further, the example peered border elements 120, 122, the example performance monitors 125, the example IMS core 130, the example S-CSCF server 135, the example ENUM server 140, the example OSS server 150, the example DNS server 155 and/or, more generally, the example IMS network 110 may be implemented by hardware, software, firmware and/or any combination of hardware, software and/or firmware. Further still, the example IMS network 110 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors. For example, the IMS core 130 may include one or more of a proxy CSCF server, an interrogating CSCF server, a feature server, an application server, a home subscriber server (HSS), a media gateway, a breakout gateway control function (BGCF) sever, a media gateway control function (MGCF) server, a softswitch, an IP router, an IP switch, etc.

Figure 2:
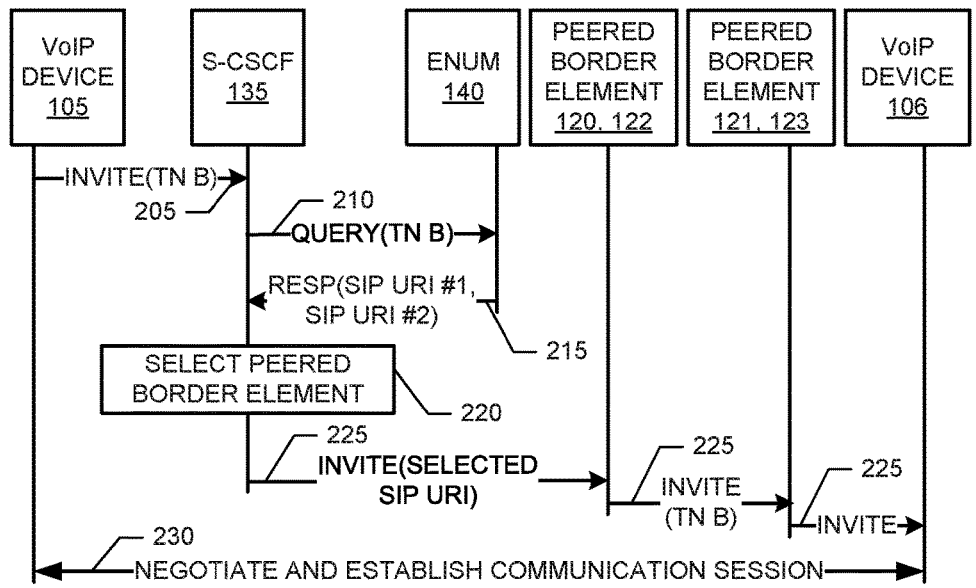
FIG. 2 illustrates example protocol message exchanges and flowcharts representative of machine accessible instructions that may be executed by, for example, a processor to implement the example serving call session control function (S-CSCF) server and/or, more generally, the example Internet protocol (IP) Multimedia Subsystem (IMS) network described herein.

FIG. 2 illustrates example protocol message exchanges and flowcharts representative of machine accessible instructions that may be executed by, for example, a processor to implement the example S-CSCF server 135 and/or, more generally, the example IMS network 110 of FIG. 1. When a communication session is initiated from a device of the service provider network 110 (e.g., from the VoIP device 105) to a device of another service provider network 111 (e.g., the VoIP device 106), the service provider network 110 must choose a peered border element 120, 122 through which to route the requested communication session.

When the S-CSCF SERVER server 135 associated with the VoIP device receives a communication session initiation request message 205 (e.g., a SIP INVITE message) from the VoIP device 105, the S-CSCF SERVER 135 performs an ENUM query 210 via the ENUM server 140. The ENUM server 140 responds 215 with one or more URIs (e.g., a first URI for the peered border element 120, a second URI for the peered border element 122, and respective priority values). Based on the returned URI(s) and priority values (and/or the order of a list of URIs), the example policy server 130 selects a peered border element 120, 122 to be used (block 220). The S-CSCF server 135 then performs a DNS lookup based for the selected peered border element 120, 122 (not shown) and uses the obtained IP address to initiate the requested communication session via a request message 225.

The peered border element 120, 122 sends the SIP INVITE message 225 to its peer 121, 123 in the other network. The other network routes the SIP INVITE message 225 to the called VoIP device 106. Using applicable past, present and/or future negotiation and/or communication establishment methods 230, the VoIP device 105 and the VoIP device 106 establish the requested communication session.

Figure 3:
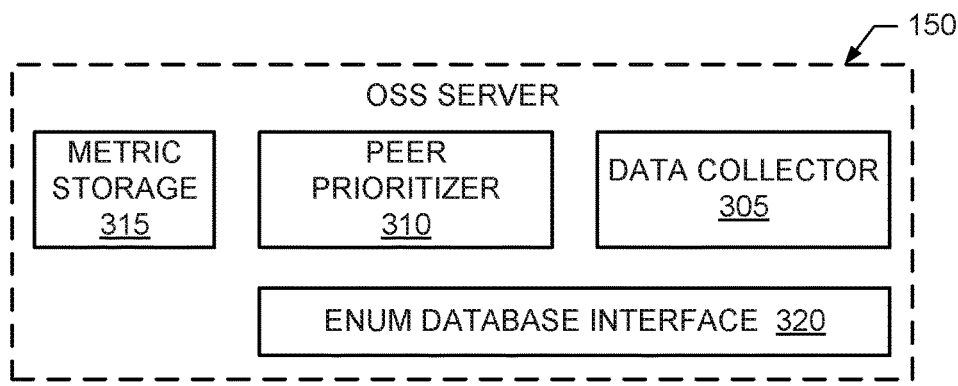
FIG. 3 illustrates an example manner of implementing the example OSS server of FIG. 1.

FIG. 3 illustrates an example manner of implementing the example OSS server 150 of FIG. 1. To collect real-time and/or dynamic network performance data and/or information, the example OSS server 150 of FIG. 3 includes a data collector 305. The data collector 305, periodically and/or aperiodically, queries performance monitors (e.g., the example performance monitors 125 of FIG. 1) for network performance data and/or information. Additionally or alternatively, the performance monitors may provide the data and/or information to the data collector 305.

To prioritize the selection of peered border elements (e.g., the example peered border elements 120, 122 of FIG. 1), the example OSS server 150 of FIG. 3 includes a peer prioritizer 310. Based on the collected network performance data and/or information, the example peer prioritizer 310 periodically and/or aperiodically computes one or more metrics that may be used to prioritize the selection of the peered border elements. For example, the peer prioritizer 310 can compute the congestion of communication paths associated with the peered border elements, the processing load of the peered border elements, and/or the state(s) of the peered border elements (e.g., operational, partially failed, failing and/or failed).

Based on the computed metrics, the example peer prioritizer 310 of FIG. 3 prioritizes the order in which the peered border elements are to be selected. For example, lightly loaded peered border elements are preferred over more heavily loaded peered border elements, failing and/or failed peered border elements are to be avoided, peered border elements having congested communication paths and/or links are less preferable to ones have less congested communication paths and/or links, etc.

To store the computed metrics, the example OSS server 150 of FIG. 3 includes metric storage 315. The example metric storage 315 of FIG. 3 stores current and/or previously computed metrics, and/or current and/or previously collected performance data and/or information. Data and/or information stored in the metric storage 315 may be used to compute current metrics and/or may be used to compute future metrics. The example metric storage 315 may be implemented using any number and/or type(s) of data structures, and/or may be implemented by any number and/or type(s) of memory(-ies) and/or memory devices (not shown)

To modify an ENUM database (e.g., the example ENUM database 145 of FIG. 1), the example OSS server 150 of FIG. 3 includes an ENUM database interface 320. After prioritizing the selection of the peered border elements, the example ENUM database interface 320 modifies one or more records of the ENUM database to represent the relative priorities computed by the example peer prioritizer 310. ENUM database records may be prioritized by modifying priority values of the ENUM database records. Additionally or alternatively, ENUM database records may be added and/or removed for a particular called party. For example, if a particular peered border element has failed and, thus, not available to process a communication session for the called party, its associated ENUM database record may be removed and/or marked as inactive. Likewise, the ENUM database interface 320 may change the status of a particular peered border element from an inactive state to an active state (e.g., available for routing a communication session) by updating its associated ENUM database record. The ENUM database interface 320 may modify the ENUM database directly by, for example, locking a database record to be changed, modifying the database record, and then unlocking the database record. Additionally or alternatively, the ENUM database may be modified by accessing an application programming interface (API) implemented by and/or provided by an ENUM server (e.g., the example ENUM server 140).

While an example manner of implementing the example OSS server 150 of FIG. 1 has been illustrated in FIG. 3, one or more of the interfaces, data structures, elements, processes and/or devices illustrated in FIG. 3 may be combined, divided, re-arranged, omitted, eliminated and/or implemented in any other way. Further, the example data collector 305, the example peer prioritizer 310, the example ENUM database interface 320 and/or, more generally, the example OSS server 150 of FIG. 3 may be implemented by hardware, software, firmware and/or any combination of hardware, software and/or firmware. Further still, a border element may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
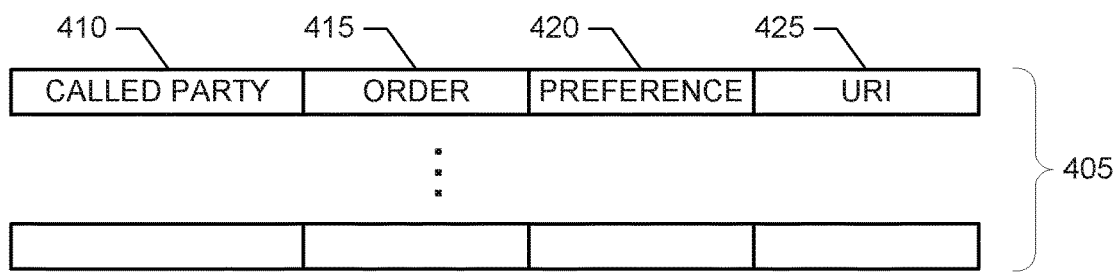
FIG. 4 illustrates an example data structure that may be used to implement the example ENUM database of FIG. 1.

FIG. 4 illustrates an example data structure that may be used to implement the example ENUM database 145 of FIG. 1. The example data structure of FIG. 4 includes a plurality of database records 405 for respective ones of a plurality of combinations of called party identifiers (e.g., an E.164 telephone numbers) and URIs (SIP, HTTP and/or otherwise). To identify a called party, each of the example database records 405 of FIG. 4 includes a called party identifier field 410. The example called party identifier 410 of FIG. 4 contains a value and/or alphanumeric string (e.g., an E.164 telephone number) that identifies a particular called party.

To specify the relative priorities of two or more URIs associated with a called party identifier 410, each of the example database records 405 of FIG. 4 includes an order field 415 and a preference field 420. The example order field 415 of FIG. 4 contains a value representative of an order in which the associated URI 425 should be selected. For example, when two or more database records are returned in response to one or more ENUM queries, a first database record having an order 415 that is less than the order 415 of a second database record would be selected before the second record. The example preference field 420 of FIG. 4 contains a value representative of a selection order amongst database records having the same order 415. For example, when two or more database records having same order 415 values are returned in response to one or more ENUM queries, a first database record having a preference 420 that is less than the preference 420 of a second database record would be selected before the second record. The order fields 415 and the preference 420 may be used in other ways to prioritize and/or to select a peered border element.

To identify a destination, each of the example database records 405 of FIG. 4 includes the example URI field 425. The example URI field 425 contains an alphanumeric string representative of a URI (SIP, HTTP and/or otherwise) via which a requested communication session to the called party 410 may be established.

While an example data structure that may be used to implement the example ENUM database 145 of FIG. 1 is illustrated in FIG. 4, the example data structure of FIG. 4 may be implemented using any number and/or type(s) of other and/or additional fields and/or data. Further, one or more of the fields and/or data illustrated in FIG. 4 may be combined, divided, re-arranged, eliminated and/or implemented in any way. For example, the example order field 415 and/or the example preference field 420 may be combined and/or eliminated. Moreover, the example data structure may include fields and/or data in addition to, or instead of, those illustrated in FIG. 4, and/or may include more than one of any or all of the illustrated fields and/or data.

Figure 5:
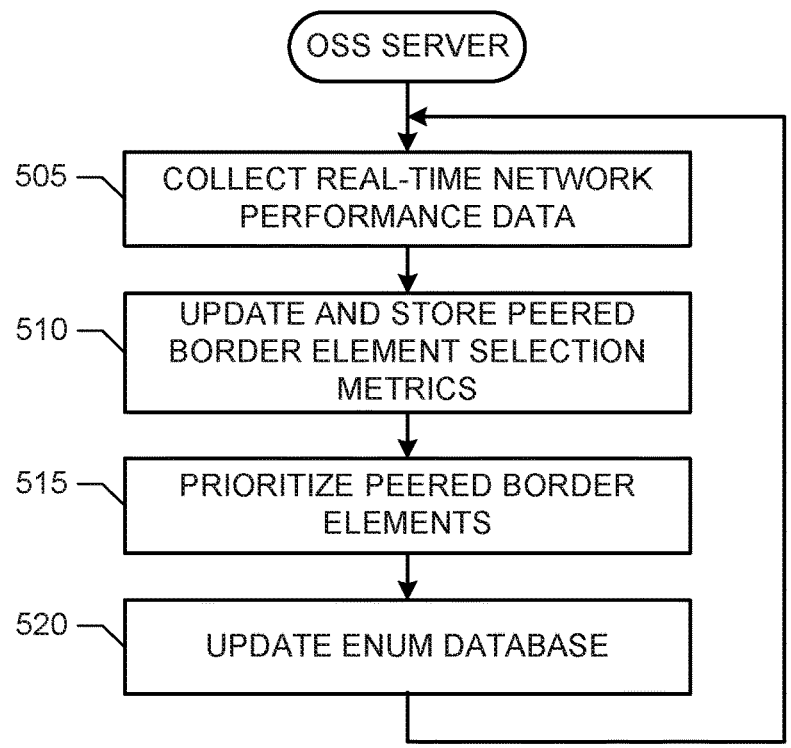
FIG. 5 is a flowchart representative of example machine accessible instructions that may be executed by, for example, a processor to implement any or all of the example OSS server of FIGS. 1 and/or 3.
Figure 6:
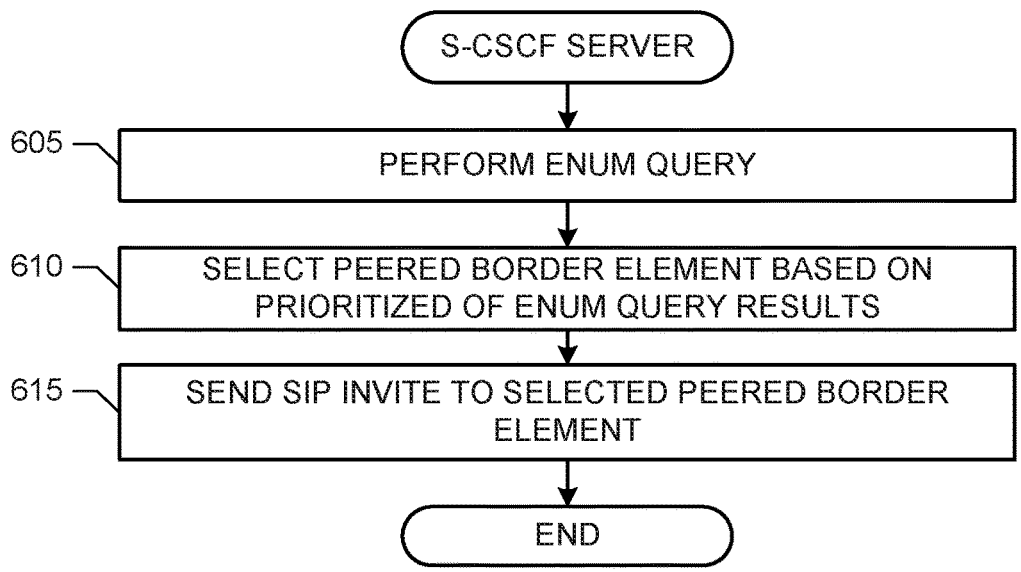
FIG. 6 is a flowchart representative of example machine accessible instructions that may be executed by, for example, a processor to implement the example S-CSCF server of FIG. 1.

FIG. 5 illustrates example machine accessible instructions that may be executed to implement any or all of the example OSS servers 150 of FIGS. 1 and/or 3. FIG. 6 illustrates example machine accessible instructions that may be executed to implement any or all of the example S-CSCF servers 135 of FIGS. 1 and/or 2. The example protocol exchanges and/or the example machine accessible instructions of FIG. 2, 5 and or 6 may be carried out by a processor, a controller and/or any other suitable processing device. For example, the example protocol exchanges and/or the machine accessible instructions of FIGS. 2, 5 and/or 6 may be embodied in coded instructions stored on a tangible medium such as a flash memory, a ROM and/or RAM associated with a processor (e.g., the example processor 705 discussed below in connection with FIG. 7). Alternatively, some or all of the example protocol exchanges and/or the machine accessible instructions of FIGS. 2, 5 and/or 6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example protocol exchanges and/or the machine accessible instructions of FIGS. 2, 5 and/or 6 may be implemented manually or as any combination of any of the foregoing techniques, for example, any combination of firmware, software, discrete logic and/or hardware. Further, persons of ordinary skill in the art will readily appreciate that many other methods of implementing the example operations of FIGS. 2, 5 and/or 6 may be employed. For example, the order of execution of the blocks may be changed, and/or one or more of the blocks described may be changed, eliminated, sub-divided, or combined. Additionally, persons of ordinary skill in the art will appreciate that any or all of the example protocol exchanges and/or the machine accessible instructions of FIGS. 2, 5 and/or 6 may be carried out sequentially and/or carried out in parallel by, for example, separate processing threads, processors, devices, discrete logic, circuits, etc.

The example machine accessible instructions of FIG. 5 may be carried out and/or executed by an OSS server (e.g., any of the example OSS servers 150 of FIGS. 1 and/or 3) on a continual, periodic and/or aperiodic basis. The example machine accessible instructions of FIG. 6 begin with an OSS server (e.g., the example data collector 305) collected and/or otherwise obtain real-time and/or dynamic network performance data and/or information (block 505).

The OSS (e.g., the example peer prioritizer 310 of FIG. 3) updates one or more peered border element selection metrics and stores the updated metric(s) in, for example, the example metric storage 315 (block 510) and (re-)prioritizes the selection of peered border elements (block 515). The OSS (e.g., the example ENUM database interface 320) updates an ENUM database (e.g., by modifying the example order fields 415 and/or the example preference fields 420, and/or by reordering the example database records 405 of FIG. 4) (block 520). Control then returns to block 505 to collect additional network performance data and/or information.

The example machine accessible instructions of FIG. 6 begin when a S-CSCF server (e.g., the example S-CSCF server 135 of FIG. 1) receives a SIP message (e.g., a SIP INVITE message) from a VoIP device (e.g., the example VoIP device 105). The S-CSCF server performs an ENUM query based on a called party identifier contained in the SIP message (block 605). Based on the results of the ENUM query (e.g., a list of two or more URIs of peered border elements and associated priority values), the S-CSCF server selects a preferred peered border element (block 610). The S-CSCF server sends a version of the received SIP message to the selected peered border element (block 615). Control then exits from the example machine accessible instructions of FIG. 6.

Figure 7:
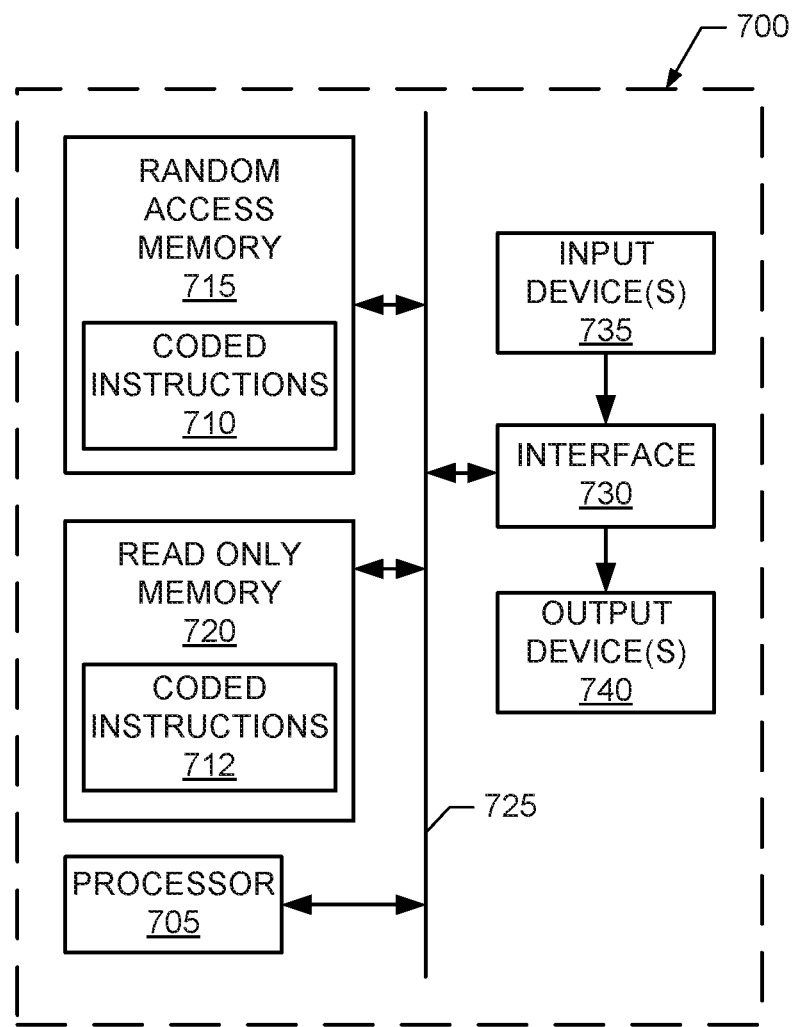
FIG. 7 is a schematic illustration of an example processor platform that may be used and/or programmed to carry out the protocol message exchanges and/or the example machine accessible instructions of FIGS. 2, 5 and/or 6 to implement any of all of the example methods and apparatus described herein.

FIG. 7 is a schematic diagram of an example processor platform 700 that may be used and/or programmed to implement all or a portion of any or all of the example VoIP devices 105 and/or 106, the example peered border elements 120, 122, the example performance monitors 125, the example S-CSCF server 135, the example ENUM server 140, the example OSS server 150 and/or the example DNS server 155 of FIGS. 1 and/or 3. For example, the processor platform 700 can be implemented by one or more general purpose processors, processor cores, microcontrollers, etc.

The processor platform 700 of the example of FIG. 7 includes at least one general purpose programmable processor 705. The processor 705 executes coded instructions 710 and/or 712 present in main memory of the processor 705 (e.g., within a random-access memory (RAM) 715 and/or a read-only memory (ROM) 720). The processor 705 may be any type of processing unit, such as a processor core, a processor and/or a microcontroller. The processor 705 may execute, among other things, the example protocol message exchanges and/or the example protocol exchanges and/or the example machine accessible instructions of FIGS. 2, 5 and/or 6 to implement the example methods and apparatus described herein.

The processor 705 is in communication with the main memory (including a ROM 720 and/or the RAM 715) via a bus 725. The RAM 715 may be implemented by DRAM, SDRAM, and/or any other type of RAM device, and ROM may be implemented by flash memory and/or any other desired type of memory device. Access to the memory 715 and the memory 720 may be controlled by a memory controller (not shown). One or both of the example memories 715 and 720 may be used to implement the example ENUM database 145 of FIGS. 1 and/or 4.

The processor platform 700 also includes an interface circuit 730. The interface circuit 730 may be implemented by any type of interface standard, such as an external memory interface, serial port, general purpose input/output, etc. One or more input devices 735 and one or more output devices 740 are connected to the interface circuit 730. The input devices 735 and/or output devices 740 may be used to, for example, implement the example ENUM database interface 320 of FIG. 3.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for operating an Internet Protocol Multimedia Subsystem (IMS) based voice over Internet protocol (VoIP) network, the method comprising:
   collecting, from first and second performance monitors of corresponding first and second peered border elements of the IMS-based VoIP network, performance data representative of dynamic performance of the first and second peered border elements;
   reducing, by executing an instruction with a processor of the IMS-based VoIP network, a likelihood of increasing communication path congestion associated with the first peered border element based on the collected performance data by prioritizing selection of the second peered border element over selection of the first peered border element; and
   modifying, by executing an instruction with the processor, a telephone number mapping database of the IMS-based VoIP network to reflect the priority of the second peered border element over the first peered border element.

2. The method as defined in claim 1, wherein the modifying of the telephone number mapping database includes modifying at least one of a preference field or an order field of a telephone number mapping database record associated with the second peered border element.

3. The method as defined in claim 1, wherein the modifying of the telephone number mapping database includes adding a telephone number mapping database record associated with the second peered border element to the telephone number mapping database.

4. The method as defined in claim 1, wherein the modifying of the telephone number mapping database includes removing a telephone number mapping database record associated with the first peered border element from the telephone number mapping database.

5. The method as defined in claim 4, wherein the removing of the telephone number mapping database record occurs when the first peered border element is at least one of failing or failed.

6. The method as defined in claim 1, wherein the telephone number mapping database is associated with a first service provider, and further including collecting the performance data from a device of a second service provider.

7. The method as defined in claim 1, wherein the collecting of the performance data occurs periodically.

8. An apparatus to operate in an Internet Protocol Multimedia Subsystem (IMS) based voice over Internet protocol (VoIP) network, the apparatus comprising:
a memory including machine readable instructions;
a processor to execute the instructions to:
collect, from first and second performance monitors of corresponding first and second peered border elements of the IMS-based VoIP network, performance data representative of a dynamic performance of the first and second peered border elements;
reduce a likelihood of increasing communication path congestion associated with the first peered border element based on the collected performance data by prioritizing selection of the second peered border element over selection of the first peered border element; and
modify a telephone number mapping database of the IMS-based VoIP network to reflect the prioritizing of the second peered border element over the first peered border element.

9. The apparatus as defined in claim 8, wherein the processor is associated with a first service provider, and the processor is to collect the data from a device of a second service provider.

10. The apparatus as defined in claim 8, wherein the processor is to modify the telephone number mapping database by modifying at least one of a preference field or an order field of a telephone number mapping database record associated with the second peered border element.

11. The apparatus as defined in claim 8, wherein the processor is to modify the telephone number mapping database by adding a telephone number mapping database record associated with the second peered border element to the telephone number mapping database.

12. The apparatus as defined in claim 8, wherein the processor is to modify the telephone number mapping database by removing a telephone number mapping database record associated with the first peered border element from the telephone number mapping database.

13. The apparatus as defined in claim 12, wherein the processor is to remove the telephone number mapping database record when the first peered border element is at least one of failing or failed.

14. A tangible machine readable storage device comprising instructions which, when executed, cause a machine in communication with an Internet Protocol Multimedia Subsystem (IMS) based voice over Internet protocol (VoIP) network to at least:
collect, from first and second performance monitors of corresponding first and second peered border elements of the IMS-based VoIP network, performance data representative of a dynamic performance of the first and second peered border elements;
reduce a likelihood of increasing communication path congestion associated with the first peered border element based on the collected performance data by prioritizing selection of the second peered border element over selection of the first peered border element; and
modify a telephone number mapping database of the IMS-based VoIP network to reflect the prioritizing of the second peered border element over the first peered border element.

15. The machine readable storage device as defined in claim 14, wherein the machine readable instructions, when executed, cause the machine to modify the telephone number mapping database by modifying an order field of a telephone number mapping database record associated with the second peered border element.

16. The machine readable storage device as defined in claim 14, wherein the machine readable instructions, when executed, cause the machine to modify the telephone number mapping database by modifying a preference field of a telephone number mapping database record associated with the second peered border element.

17. The machine readable storage device as defined in claim 14, wherein the machine readable instructions, when executed, cause the machine to modify the telephone number mapping database by adding a telephone number mapping database record associated with the second peered border element to the telephone number mapping database.

18. The machine readable storage device as defined in claim 14, wherein the machine readable instructions, when executed, cause the machine to modify the telephone number mapping database by removing a telephone number mapping database record associated with the first peered border element from the telephone number mapping database.

19. The machine readable storage device as defined in claim 18, wherein the machine readable instructions, when executed, cause the machine to remove the telephone number mapping database record when the first peered border element is at least one of failing or failed.

* * * * *